United States Patent

[11] 3,572,797

| [72] | Inventor | Harry J. Shay<br>Rockford, Ill. |
|---|---|---|
| [21] | Appl. No. | 817,294 |
| [22] | Filed | Apr. 17, 1969 |
| [45] | Patented | Mar. 30, 1971 |
| [73] | Assignee | L.W. Menziner Trustee<br>Rockford, Ill.<br>Continuation of application Ser. No.<br>614,196, Feb. 6, 1967, now abandoned. |

[54] STRIKER FOR USE WITH A VEHICLE LATCH
6 Claims, 5 Drawing Figs.

[52] U.S. Cl. ..................................................292/341.12,
292/340
[51] Int. Cl. ........................................................ E05b 15/02
[50] Field of Search ...........................................292/341.12,
216, (Unofficial), 340, 304; 85/42

[56] References Cited
UNITED STATES PATENTS
| 582,039 | 5/1897 | Campbell ..................... | 292/216 |
|---|---|---|---|
| 1,126,531 | 1/1915 | Liebmann ..................... | 85/42 |
| 3,190,682 | 6/1965 | Fox ............................... | 292/216 |
| 3,309,127 | 3/1967 | Pickles ......................... | 292/216 |
| 3,371,948 | 3/1968 | Velavicius .................... | 292/341.12 |

FOREIGN PATENTS
| 315,182 | 7/1929 | Great Britain ................ | 85/42 |

Primary Examiner—Marvin A. Champion
Assistant Examiner—Edward J. McCarthy
Attorney—Wolfe, Hubbard, Voit and Osann ABSTRACT: A striker for coacting with a latching device to hold an automotive vehicle door in a closed position. The striker includes a keeper pin for engaging the latching device, a shank threaded into the door post, and a washer formed integrally with the pin and the shank to permit the cross section and strength of the shank to be increased. A pair of diametrically opposed driving flats are formed in the peripheral edge of the washer and are adapted to be engaged by a tool for threading the shank into the door post.

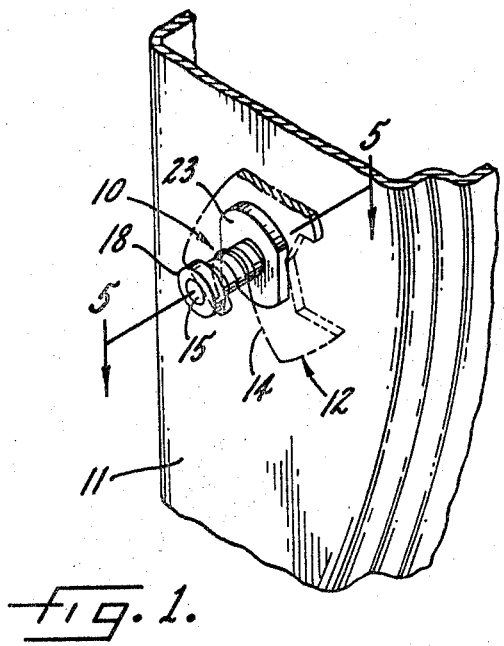
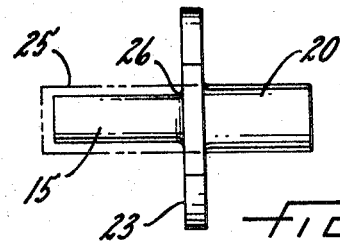
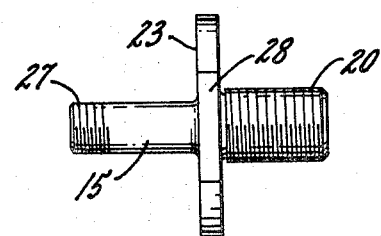
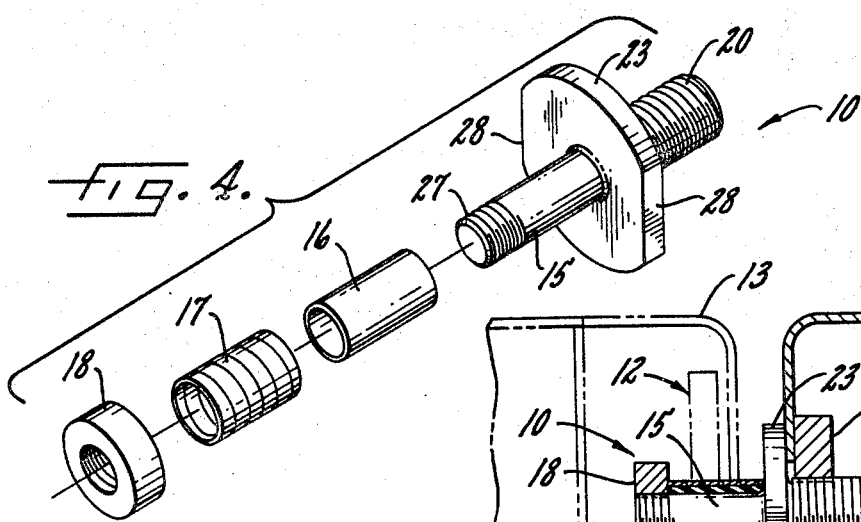
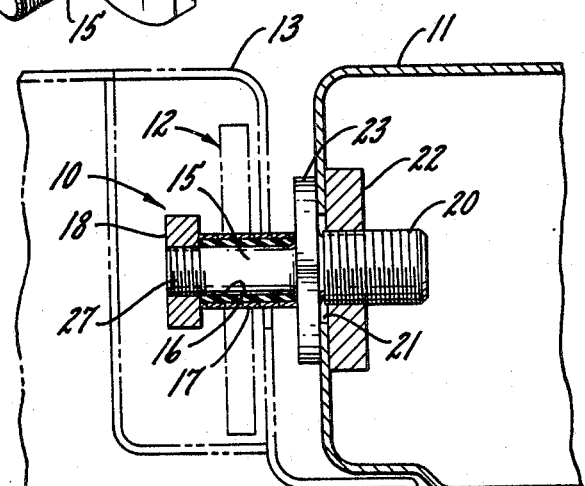

STRIKER FOR USE WITH A VEHICLE LATCH

CROSS REFERENCE TO A RELATED APPLICATION

This application is a continuation of my copending application Ser. No. 614,196, filed Feb. 6, 1967 and now abandoned.

BACKGROUND OF THE INVENTION

This invention relates to a striker adapted for mounting on the frame member of an automotive vehicle and engageable with a latching device carried by a movable member such as the vehicle door to hold the door in a closed position. More particularly, the invention relates to a striker of the type including a keeper pin for engaging the latching device, a shank joined to the inner end of the pin and threaded into the frame member, and a washer disposed between the pin and the shank and positioned in face-to-face engagement with the outer side of the frame member.

SUMMARY OF THE INVENTION

The primary aim of the present invention is to provide a new and improved striker of the foregoing character which is more rugged in service use and which may be manufactured and installed more easily than prior strikers of the same general type. To achieve these ends, the keeper pin, the threaded shank and the washer are formed as a one-piece integral unit to provide a shank of increased size and strength for a pin of given diameter. The washer, being formed integrally with the pin and the shank, does not have to be assembled by an additional operation and is utilized to facilitate attachment of the striker to the frame member.

BRIEF DESCRIPTION OF THE DRAWINGS

FIG. 1 is a fragmentary perspective view of a vehicle frame member equipped with a striker embodying the novel features of the present invention.

FIG. 2 is a side elevational view of the striker during one stage of its manufacture.

FIG. 3 is a side elevational view of the striker in its finished form.

FIG. 4 is an enlarged exploded perspective view of the striker shown in FIG. 1.

FIG. 5 is an enlarged fragmentary cross section taken substantially along the line 5-5 of FIG. 1.

DETAILED DESCRIPTION

As shown in the drawings for purposes of illustration, the invention is embodied in a striker 10 mounted on the door post 11 of an automotive vehicle frame and coacting with a latching member 12 carried by the vehicle door 13 (FIG. 5) to latch the door in a closed position. Herein, the latching member is formed with a notched fork 14 (FIG. 1) which is rotated into interlocking engagement with the striker as an incident to closing of the door.

The striker 10 includes a cylindrical keeper pin 15 projecting outwardly from the post 11 and disposed in the path followed by the fork 14 of the latching member 12 when the door 13 is swung to a closed position. Preferably, a resiliently yieldable sleeve is telescoped over the keeper pin to hold the fork tightly against the pin and thus reduce noise and vibration. In this instance, the sleeve is formed by an internal rubber tube 16 (FIG. 4) which closely surrounds the pin, and by a coiled helical spring 17 which is telescoped over both the tube and the pin. A retaining head 18 on the outer end of the pin prevents the spring and the tube from sliding endwise off of the pin.

As shown in FIGS. 3 and 5, a cylindrical shank 20 joined to the inner end of the keeper pin 15 projects inwardly through a hole 21 punched in the door post 11 and is threaded into a tapping plate 22 fastened to the inside of the post thereby to secure the striker 10 to the post. An enlarged washer 23 is disposed between the pin and the shank and is positioned in face-to-face engagement with the outer side of the post to cover the hole 21.

In accordance with the present invention, the keeper pin 15, the shank 20 and the washer 23 are formed integrally with each other and as a one-piece body in order to provide, for a pin of given diameter, a shank which is of increased size and strength so as to be less susceptible to failure under the application of impact forces and bending stresses occurring during vehicular collisions. Moreover, the washer is formed at the same time as the pin and the shank thus eliminating the need of separately attaching the washer to the pin and shank.

In one specific example of the invention, the washer 23 is formed as an integral unit with the keeper pin 15 and the shank 20 by upsetting a cylindrical blank 25 of steel (Shown in phantom in FIG. 2) 1.8 inches in length and having a uniform diameter of approximately 0.450 of an inch. With the use of an upsetting die, a one inch length of the outer end portion of the blank is reduced to a diameter of about 0.375 of an inch to form the keeper pin 15 and, at the same time, the washer 23 is formed at the inner end of the pin by the steel forced inwardly along the blank, the washer herein being generally circular and having a diameter of 1.5 inches. As an incident to upsetting the blank, a small rounded fillet 26 is formed at the junction of the inner end of the and the outer face of the washer to relieve stress concentrations and thus increase the strength of the pin at this point. Accordingly, the tendency of the pin to shear away from the washer and the shank in case of an accident is reduced significantly.

As shown in FIG. 2 the original diameter of the inner end portion of the blank 25 is retained so that shank 20 is formed with an unthreaded diameter of 0.450 of an inch. After the washer 23 has been upset, a thread is rolled on the shank thereby to increase the major diameter of the shank in the example shown to 0.5 of an inch. As a result, a threaded shank of increased cross section is provided for a pin 15 of given diameter, and the striker thus is strengthened at its point of connection to the post 11 where the stresses usually are greatest during a collision. In addition, assembly of the striker is simplified since the washer does not have to be threaded on or separately fastened to the pin and the shank.

After the body of the striker 10 has been manufactured, the rubber tube 16 and the coil spring 17 are assembled by slipping these members over the outer end of the pin 15. To permit the tube and the spring to be installed from the outer end of the pin and yet still fit snugly around the pink the retaining head 18 herein is in the form of a detachable nut which may be threaded onto the pin after the tube and the spring are assembled. A thread 27 for the nut 18 may be rolled on the outer end of the pin at the same time the thread is formed on the shank 20.

Advantage is taken of the rigid and integral joint between the washer 23 and the shank 20 to enable use of the washer as a means by which the striker 10 may be rotated to thread the shank into the tapping plate 22. For this purpose, the peripheral edge of the washer is formed with a pair of diametrically opposed driving flats 28 which may be engaged by a suitable tool for rotating the striker. The flats may be formed at the same time that the blank 25 is upset to form the washer simply by using an appropriately shaped die.

From the foregoing, it will be apparent that the striker 10 of the present invention contributes significantly in reducing the likelihood of the vehicle door being forced open in case of an accident since the striker is strengthened at the shank 20 where failure often occurs. In addition, the relatively simple construction of the striker is well adapted for manufacture and assembly with modern automated equipment. While the striker has been illustrated for use with a latching device carried by the vehicle door, it is evident that the striker also may be used in conjunction with the latching device of a rear deck lid or of any other movable member which is to be latched in a stationary position.

I claim:

1. In a striker mountable on a vehicle frame member and engageable with a latching device, the combination of, a cylindrical keeper pin of predetermined diameter extending outwardly from the frame member for engagement with the latching device, a threaded cylindrical shank of larger diameter than said pin formed integrally with and projecting axially from the inner end of the pin and adapted to be threaded into the frame member, an enlarged washer formed integrally with and projecting radially from the pin and the shank and disposed between the pin and the shank for face-to-face engagement with the outer side of the frame member, a tubular sleeve telescoped over said pin and having an internal diameter smaller than the diameter of said shank, and a head formed separately of said pin and fastened to the outer end of said pin to hold said sleeve on said pin.

2. A striker as defined in claim 1 in which said head is threaded onto the outer end of said pin.

3. A striker as defined in claim 2 in which the peripheral edge of said washer is formed with a pair of spaced driving flats engageable with a tool for threading said shank into the frame member.

4. The combination of a vehicle frame member, a latching device, and a striker on said frame member and engageable with said latching device, said combination being characterized by the striker having a one-piece body comprising a cylindrical keeper pin of predetermined diameter extending outwardly from the frame member for engagement with the latching device, a threaded cylindrical shank of larger diameter than said pin formed integrally with and projecting axially from the inner end of the pin and threaded into the frame member, an enlarged washer formed integrally with and projecting radially from the pin and the shank and disposed between the pin and the shank in face-to-face engagement with the outer side of the frame member, and a cylindrical head of larger diameter than said pin formed separately of and attached to the outer end of the pin.

5. The combination defined in claim 4 in which the peripheral edge of said washer is formed with a pair of diametrically spaced driving flats engageable with a tool for threading said shank into the frame member.

6. The combination defined in claim 4 further including a rounded fillet of larger diameter than the pin encircling the inner end of the pin and integral with the outer face of said washer.